US011165595B2

(12) United States Patent
Malicoat et al.

(10) Patent No.: US 11,165,595 B2
(45) Date of Patent: Nov. 2, 2021

(54) NETWORK AND SWITCH PROVIDING CONTROLLABLE POWER THROUGH OUTLETS AND COMMUNICATION PORTS

(71) Applicant: Tallac Networks, Inc., Rocklin, CA (US)

(72) Inventors: David Malicoat, Auburn, CA (US); William R. Johnson, Meadow Vista, CA (US); Paul T. Congdon, Granite Bay, CA (US)

(73) Assignee: Tallac Networks, Inc., Rocklin, CA (US)

( * ) Notice: Subject to any disclaimer, the term of this patent is extended or adjusted under 35 U.S.C. 154(b) by 65 days.

(21) Appl. No.: 16/168,701

(22) Filed: Oct. 23, 2018

(65) Prior Publication Data
US 2020/0127862 A1    Apr. 23, 2020

(51) Int. Cl.
| | | |
|---|---|---|
| *H04L 12/10* | (2006.01) | |
| *H04L 12/12* | (2006.01) | |
| *H04L 12/24* | (2006.01) | |
| *H04L 29/08* | (2006.01) | |
| *H04L 12/931* | (2013.01) | |

(52) U.S. Cl.
CPC .............. *H04L 12/10* (2013.01); *H04L 12/12* (2013.01); *H04L 41/0886* (2013.01); *H04L 49/351* (2013.01); *H04L 67/025* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,271,502 B1* | 9/2007 | Remaker | ................. | G06F 1/266 307/38 |
| 8,046,619 B2* | 10/2011 | Newland | ................. | H04L 12/10 713/340 |
| 8,205,099 B2* | 6/2012 | Hussain | ............ | H04L 12/40045 713/300 |
| 8,250,381 B2* | 8/2012 | Hansalia | ................. | G06F 1/266 713/300 |
| 8,595,516 B2* | 11/2013 | Panguluri | ............... | G06F 1/266 713/300 |
| 2006/0217847 A1* | 9/2006 | Anderson | ............... | H04L 12/10 700/286 |
| 2009/0217062 A1* | 8/2009 | Diab | ....................... | H04L 12/10 713/310 |
| 2009/0249112 A1* | 10/2009 | Diab | ....................... | H04L 12/10 714/2 |
| 2010/0145542 A1* | 6/2010 | Chapel | .............. | H02J 13/00034 700/295 |
| 2013/0013949 A1* | 1/2013 | Mohammed | ............ | H04L 12/10 713/340 |

(Continued)

*Primary Examiner* — Raymond N Phan
(74) *Attorney, Agent, or Firm* — David T. Millers

(57) ABSTRACT

An apparatus such as a network switch includes a power supply device configured to control power supplied through ports such as Ethernet ports to the network devices such as wireless access portions that are part of a local network. The apparatus further includes a second power supply device with one or more switched outlets for providing direct power other devices of the local network. A controller in the apparatus may be programmed to control the power supply devices to execute to a diagnostic procedure or a reset procedure that cycles power, off and then on, to devices of the local network.

13 Claims, 2 Drawing Sheets

(56) References Cited

U.S. PATENT DOCUMENTS

| | | | |
|---|---|---|---|
| 2013/0173937 A1* | 7/2013 | Lee | H04L 12/10 |
| | | | 713/300 |
| 2014/0115354 A1* | 4/2014 | Jabbaz | H04L 12/10 |
| | | | 713/310 |
| 2014/0208140 A1* | 7/2014 | Brooks | G06F 1/3209 |
| | | | 713/320 |
| 2014/0215254 A1* | 7/2014 | Mandava | G06F 1/266 |
| | | | 713/340 |
| 2014/0365805 A1* | 12/2014 | Balasubramanian | H04L 12/10 |
| | | | 713/340 |
| 2015/0326403 A1* | 11/2015 | Dwelley | G01R 31/67 |
| | | | 713/300 |
| 2016/0210136 A1* | 7/2016 | Huang | H04L 41/082 |
| 2017/0040838 A1* | 2/2017 | Huang | H02J 9/066 |
| 2017/0155518 A1* | 6/2017 | Yang | H04L 12/10 |
| 2018/0116038 A1* | 4/2018 | Snyder | H05B 47/18 |
| 2019/0278347 A1* | 9/2019 | Goergen | H04L 12/10 |
| 2020/0301496 A1* | 9/2020 | Higuchi | G06F 1/26 |

\* cited by examiner

NETWORK AND SWITCH PROVIDING CONTROLLABLE POWER THROUGH OUTLETS AND COMMUNICATION PORTS

BACKGROUND

A modern enterprise may suffer a significant or complete loss of productivity when a network service interruption occurs or when network equipment is otherwise not working properly. Accordingly, many enterprises employ information technology (IT) personnel to manage or maintain computer networks and associated equipment. But, in a multi-location or multi-office enterprise, IT professionals may only be available at the main office or the larger facilities of the enterprise, and smaller or branch offices may not have an onsite IT professional. Many other enterprises, particularly smaller businesses, that require network service do not have full-time IT personnel. Accordingly, when a network service interruption occurs, the productivity of an enterprise branch office or other location may suffer until a knowledgeable person such as an IT professional arrives at the location to troubleshoot and correct network problems. Systems and methods for reducing such productivity losses are desired.

SUMMARY

An integrated apparatus allows automated or remote management of local network devices on a private network that may be separated by routers that interface with an internet service provider (ISP) to the public cloud. The apparatus may particularly provide management of direct power and Power over Ethernet (PoE) for network equipment, which allows automated or remote power cycling of the network equipment to troubleshoot or reset the network equipment after a network service interruption.

In one implementation, a branch office network or remote site location switch system includes Ethernet switch ports, a Power-over-Ethernet (PoE) controller, a power sourcing equipment (PSE) controller, a host computer with USB expansion, and host computer controlled switched AC utility ports.

In accordance with one aspect of the invention, an apparatus such as a network switch combines network switching functions with power supply and power control functionality. The network switch may provide PoE and direct AC or DC power to multiple discrete devices, and the apparatus may integrate hardware and software management features to manage a local network infrastructure. A single managed device may thus create a simpler usage model and a simpler managed solution, particularly in a branch office environment. The apparatus may function without need of companion devices and may not require any portion of the local network to be functional.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

Figure 1:
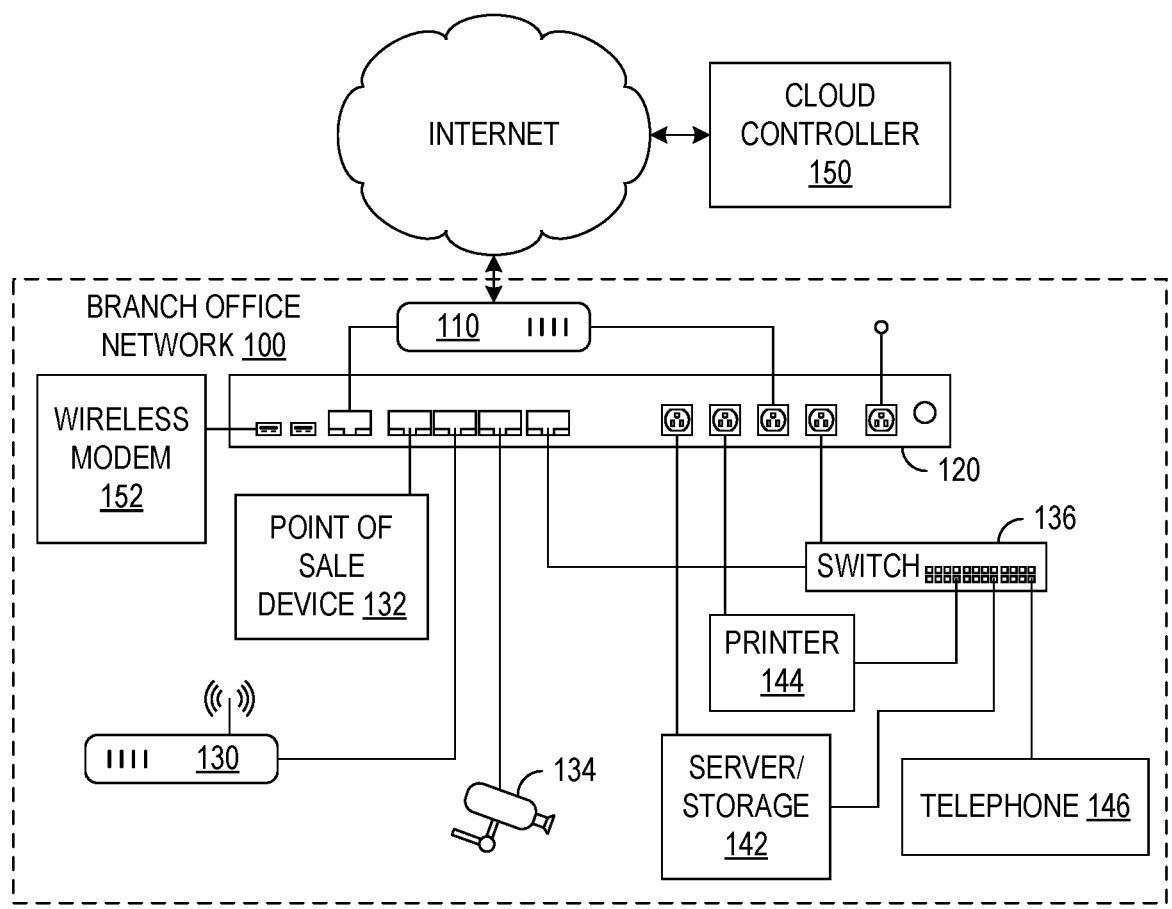
FIG. 1 is a block diagram of an installation including a network switch in accordance with an example implementation.

FIG. 1 is a block diagram of a simple installation of a network 100, which may be implemented in a branch office of an enterprise. Network 100 may have a gateway/router device including a wide area network (WAN) interface 110 such as a WAN modem that may connect to the Internet (or other public network) or to a private WAN serving multiple geographically separated locations of an enterprise. Network 100 also includes a network switch 120 and one or more wireless access points 130 that tie the local office network topology together. In particular, network switch 120 may connect to the Internet through WAN interface 110 and provide Internet service, e.g., through Ethernet ports and cables to wireless access points 130 that in turn connect to wireless end points (not shown). Network switch 120 may also have wired communication links, e.g., Ethernet connections, to other network devices such as a point-of-sale device 132, a security camera 134, or an Ethernet switch 136 to name a few. In the specific implementation shown in FIG. 1, one or more of network devices 132, 134, and 136 having wired Ethernet connections to network switch 120 may be powered using power over Ethernet (PoE), but any network device, e.g., Ethernet switch 136, that has a wired Ethernet connection to network switch 120, may alternatively be connected to an AC utility port of network switch 120. As shown in FIG. 1, switch 136 receives line power, e.g., 60-Hz 120 volts or 50-Hz 220 volts, from network switch 120. Network switch 120 also has AC utility ports connected to supply power to WAN interface 110 and to other network devices such as a server/storage device 142, a networked peripheral such as a printer 144, or a VoIP telephone system 146, which may be connected to local network 100 through wired or wireless network connections.

Network switch 120 in a branch office environment may provide a single integrated point of control and may particularly allow for or simplify automated or remotely controlled network troubleshooting and recovery operations to maintain local network 100. Many local network installations may be used for continued operation without onsite IT personnel. For example, branch offices today generally do not have onsite IT support to manage the installed IT infrastructure such as used in network 100, and a branch office may rely on a remote management team to maintain the operation of the branch office infrastructure. For example, a cloud controller 150, which may be at a location remote from network 100, may communicate with network switch 120 to perform maintenance or management operations as describe further below. Cloud controller 150 may communicate with network switch 120 through WAN interface 110 or through an auxiliary connection 152, e.g., a 3G, 4G, or 5G modem, when an Internet connection through WAN interface 110 is not available. In a typical installation at a branch office, the bulk of the network equipment, e.g., WAN interface 110, a local server 142, and network switch 120, may be in a single location within the building, e.g., in a room where power, phone lines, and the WAN connection are brought together. Wireless access points 130, peripherals 144, and VoIP telephone equipment 146 may be distributed throughout the office space.

Network equipment conventionally requires personnel to be at the location of the network for troubleshooting or maintenance operations. For example, when a service disruption occurs in a branch office network where no IT professional is available, untrained onsite office personnel may be the first resource used to mitigate the service disruption. The office personnel will generally need to locate the network equipment and verify that the current network equipment is powered up and functioning correctly. After the equipment has been located, power cycling of the equipment is typically performed to reset each device in case of hardware/software hangs. If the problem is not with the WAN interface, power cycling the network equipment can solve many problems. If no one trusted to work on the network equipment is onsite at the time of a service disruption, a trusted person would need to be sent onsite to locate and mitigate the problem.

Figure 2:
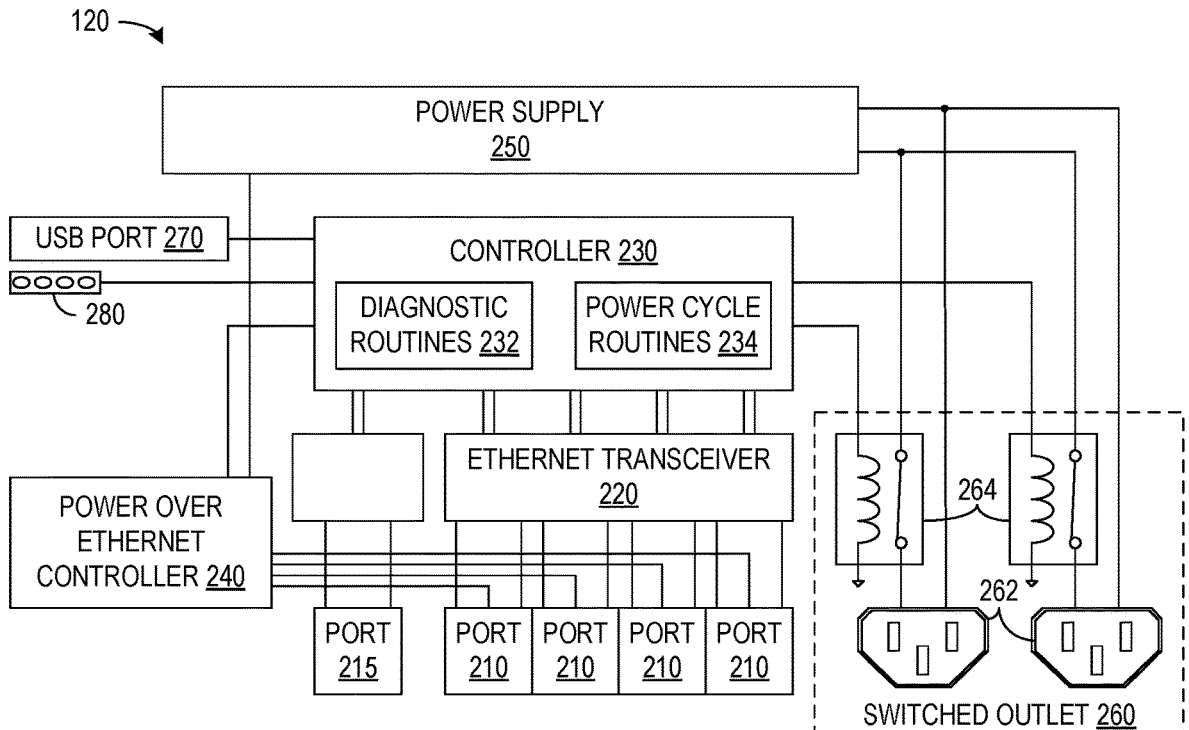
FIG. 2 is a block diagram of a network switch in accordance with an example implementation.

In accordance with an aspect of the current invention, network switch 120 combines control of common branch office equipment into a single device. Network switch 120 performs basic network switch features, e.g., Ethernet network switching functionality, and additionally provides programmable power control capabilities. FIG. 2 is a block diagram showing one implementation of a network switch 120 including network ports 210 and 215, e.g., Ethernet switch ports. A set of Ethernet switch ports 210 can be used to provide wired network connectivity to additional Ethernet switches and to the wireless access points distributed throughout the branch office, and Ethernet switch port 215 can be used to provide wired network connectivity to a WAN cloud router providing the WAN interface. A transceiver 220, e.g., an Ethernet transceiver circuit, under control of a microcontroller or controller 230 may implement conventional routing or network switching as necessary to provide network service. Controller 230 may be built-in and integrated into network switch 120. Transceivers 220 and controller 230 may or may not be integrated together within network switch 120. In addition to controlling Ethernet transceiver, controller 230 also controls a Power-over-Ethernet (PoE) controller 240, e.g., a PoE+Controller providing power to Ethernet ports 210. PoE controller 240 is connected to provide PSE power, e.g., through Ethernet cables, to devices such as the wireless access points coupled to Ethernet ports 210.

Network switch 120 further includes an internal power supply 250 and switched AC outlets 260 under control of controller 230. Power supply 250 provides power for the internal electronics, e.g., controller 230, transceiver 220, PoE controller 240, and switched AC outlets 260. Switched AC outlets 260 include one or more AC utility ports 262 with power switches 264 that controller 230 can turn on or off, e.g., to power cycle connected devices. Each power switch 264 may be an AC relay connected to turn a connected AC outlet 262 to ON or OFF. The host-computer-controlled switched AC outlets 262 can be used to provide power to critical network devices that are AC powered in the branch office network topology, e.g., to a WAN modem, Ethernet switches, or AC powered wireless access points.

Network switch 120 can be connected to control the power supplied to all of the critical local network devices in a branch office or other network installation. Controller 230 in network switch 120 thus has a programmable capability to manage the power delivery, to power cycle each device individually on an as-needed basis, and to test network connectivity to all of the devices in the branch office whether the devices are powered from PoE controller 240 via ports 210 or from switched AC outlets 260. For example, controller 230 can be programmed or directed to use PoE controller 240 and switched AC outlets 260 to initiate a hardware power reset cycle of connected wireless access points, network connected devices, or the WAN modem/gateway. FIG. 2 illustrates an implementation in which controller 230 employs software routines 232 and 234 that may be stored in the memory of controller 230 and that controller 230 may execute automatically or under remote direction, e.g., in response to a command sent from cloud controller 150 to network switch 120. For example, controller 230 may execute diagnostic routines 232 to detect or identify service interruptions or other error conditions on the local network. For example, controller 230 may process network traffic for switching functions and may monitor data flow to detect error conditions. Controller 230 may also execute power cycle routines 234 to power cycle network devices that receive power, e.g., PoE or line power, from network switch 120. For example, controller 230 may power cycle a set of devices simultaneously or in a programmed series depending on the particular error condition detected.

Controller 230 is further connected to a communication port, e.g., at least one USB port 270, that may be used for expansion or to allow alternative connectivity, e.g., to a wireless 3G, 4G LTE, or 5G modem, e.g., modem 152 in FIG. 1. Alternative connectivity may be used, for example, to allow a remote technician or cloud controller to send commands or instructions to controller 230 when the WAN interface is inoperable. In particular, a remote technician or a cloud controller may direct controller 230 to execute a specified one of the power cycle routines 234. The alternative connectivity through USB port 270 may also be used to provide a backup Internet connection to the local network when service through the WAN interface is unavailable.

Network switch 120 may further include indicators 280, e.g., LEDs, to indicate the status of network switch 120. For example, at least two multicolor LEDs for each Ethernet switch port 210 and 215 may identify connection speed and PoE+powered status. Indicators 280 may also include LEDs to indicate whether switched AC outlets 260 are powered.

Figure 3:
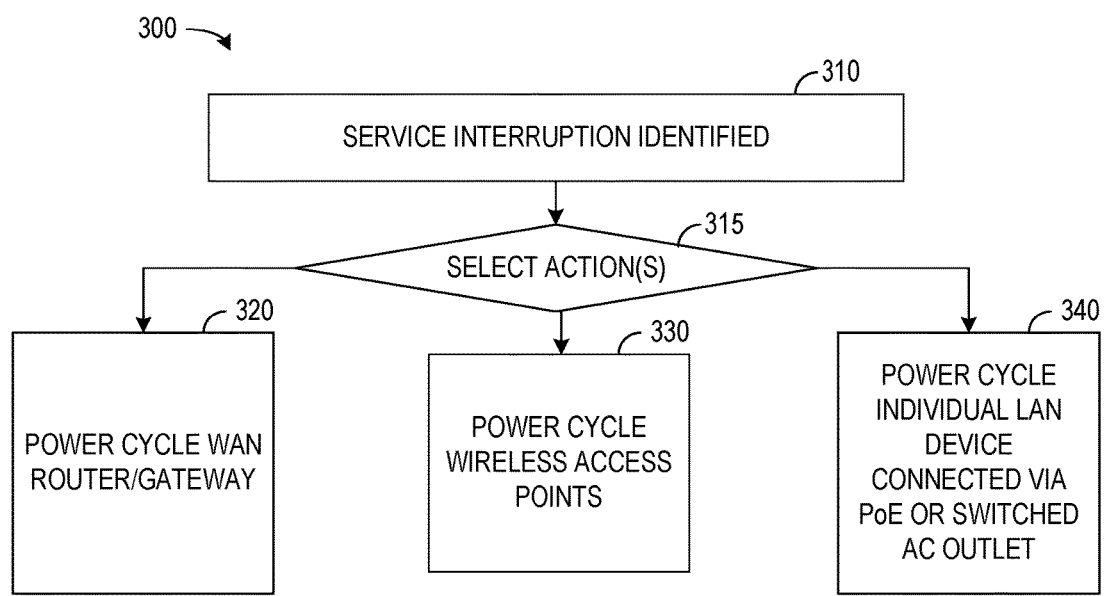
FIG. 3 is a flow diagram of a process employing a network switch in accordance with an example implementation.

FIG. 3 shows a flow of a process 300 that may be conducted using network switch 120 of FIG. 2 in the local network 100 of FIG. 1. Block 310 of process 300 represents identification of a service interruption, e.g., at the branch office. In some cases, controller 230 may be able to detect the service interruption, e.g., through monitoring switching functions of network switch 120. In other cases, a network user may report the service interruption, e.g., to cloud controller 150 in the implementation of FIG. 1, and a command based on the report may be sent to local controller 230. A command to controller 230 may, for example, cause controller 230 to execute a particular diagnostic routine 232 that attempts to identify the type or cause of the service interruption. In whatever manner the service interruption is identified, local controller 230 (in an automated process or under the direction of cloud controller 150) can execute a process block 315 to select or control an appropriate corrective procedure, e.g., to execute one or more power cycle routines 234.

If the service interruption at a branch office is (or may be) due to the onsite WAN modem 110 or a failure at the ISP that is inhibiting connection to the public cloud, controller 230 has the ability to power cycle WAN modem 110 through the switched AC power outlet as illustrated by block 320. If the branch connectivity is not restored from a power cycle to the WAN modem, there may be a service issue with their ISP. Network switch 120 may have at least one USB expansion port, which may be connected to a wireless modem 152. For example, the USB expansion port may be populated with wireless carrier's 3G/4G LTE modem. Automatically or in response to a remote command, switch 120 may redirected traffic to wireless modem 152 in the event of a connectivity failure with the primary WAN modem 110. Through a secure VPN Access, remote access and control can be achieved to manage the entire network topology from the host computer.

A service interruption that occurs while the WAN interface provides a connection to the public cloud or after connection to the public cloud is restored may be caused by one or more of the wireless access points. Controller 230 can address a WiFi connection issue occurring when network switch 120 has service to the public cloud by power cycling (process block 330) one or more of wireless access points 130. Controller 230 may either be self-initiated or remotely directed, e.g., by cloud controller 150, to execute appropriate procedures to conduct power cycling of the wireless access points in block 330. Similarly, if any other network devices are identified as not (or possibly not) operating as desired, controller 230 can power cycle one or more individual LAN devices in a process block 340.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A network switch comprising:
a plurality of ports implementing a protocol for communication through a local network including first devices connected to the ports;
a first power supply device configured to control power supplied to the first devices through the ports;
one or more AC outlets providing power to one or more second devices of the local network;
a second power supply device configured to control power supplied to the second devices through the AC outlets; and
a controller configured to control the first power supply device and the second power device, the controller being programmable to independently switch on and off the power from the ports and the AC outlets.

2. The apparatus of claim 1, wherein the ports comprises Ethernet ports, and the first power supply device comprises a power over Ethernet controller.

3. The apparatus of claim 1, wherein the controller is further configured to execute to a reset procedure that cycles, off and then on, power to one or more of the first devices and the second devices.

4. The apparatus of claim 3, wherein the controller executes the reset procedure in response to sensing a service interruption in the network.

5. The apparatus of claim 3, wherein the controller executes the reset procedure in response to command sent from a remote user, through a wide area network, to the network switch.

6. The apparatus of claim 5, the wide area network is selected from a group consisting of an enterprise network, a public network, the Internet, a telephone network, a 3G network, a 4G network, and a 5G network.

7. The apparatus of claim 1, further comprising a communication port through which the controller receives commands.

8. The apparatus of claim 7, wherein the communication port comprises a USB port.

9. A network comprising:
a network switch;
a gateway coupled to the network switch and providing access to a wide area network, the gateway operating on power from an outlet provided in the network switch; and
one or more devices having wired communication links to the network switch and operating on power received through the wired communication links, wherein the network switch comprises:
one or more ports respectively connected through the wired communication links to the one or more devices, the ports implementing a protocol for communication through a local network including the one or more devices;
a first power supply device configured to control power supplied to the one or more devices through the ports;
a second power supply device configured to control the outlet providing power to the gateway; and
a controller configured to control the first power supply device and the second power device.

10. The network of claim 9, wherein the controller is further configured to execute to a reset procedure that cycles power, off and then on, to the one or more devices and the gateway.

11. A network comprising:
a network switch;
a gateway coupled to the network switch and providing access to a wide area network, the gateway operating on power from an outlet provided in the network switch;
one or more devices having wired communication links to the network switch and operating on power received through the wired communication links; and
a controller in the network switch, the controller being configured to execute to a reset procedure that cycles power, off and then on, to the gateway in response to a reset command.

12. The network of claim 11, further comprising an auxiliary connection device providing to the network switch remote communications independent of the gateway, the controller being connected to receive the reset command through the auxiliary connection device.

13. The network of claim 12, wherein the auxiliary connection device provides communication to the network switch through a second wide area network selected from a group consisting of an enterprise network, a public network, the Internet, a telephone network, a 3G network, a 4G network, and a 5G network.

* * * * *